United States Patent
Espindola

(10) Patent No.: US 8,309,846 B2
(45) Date of Patent: Nov. 13, 2012

(54) DEVICE FOR DYNAMICALLY NEUTRALIZING VIBRATIONS IN SINGLE CABLE OVERHEAD POWER TRANSMISSION LINES

(75) Inventor: Jose Joao Espindola, Florianopolis (BR)

(73) Assignees: Jose Joao de Espindola, Florianopolis, Santa Catarina (BR); Wetzel S.A., Joinville, Santa Catarina (BR)

( * ) Notice: Subject to any disclaimer, the term of this patent is extended or adjusted under 35 U.S.C. 154(b) by 260 days.

(21) Appl. No.: 12/936,364

(22) PCT Filed: Feb. 19, 2009

(86) PCT No.: PCT/BR2009/000042
§ 371 (c)(1),
(2), (4) Date: Oct. 4, 2010

(87) PCT Pub. No.: WO2010/094093
PCT Pub. Date: Aug. 26, 2010

(65) Prior Publication Data
US 2011/0024152 A1     Feb. 3, 2011

(51) Int. Cl.
*H02G 7/14* (2006.01)
(52) U.S. Cl. ............ 174/42; 174/40 R; 174/40 CC
(58) Field of Classification Search ............ 174/42, 174/146, 137 R, 40 R, 41, 44, 40 TD, 45 TD, 174/174, 40 CC; 248/63, 560; 267/178
See application file for complete search history.

(56) References Cited

U.S. PATENT DOCUMENTS

| | | | |
|---|---|---|---|
| 1,675,391 A | 7/1928 | Stockbridge | |
| 3,474,184 A | 10/1969 | Crosby et al. | |
| 3,584,133 A * | 6/1971 | Claren | 174/42 |
| 3,711,624 A | 1/1973 | Dulhunty | |
| 3,906,143 A | 9/1975 | LeBlanc | |
| 4,011,397 A | 3/1977 | Bouche | |
| 4,140,868 A | 2/1979 | Tuttle | |
| 4,159,393 A | 6/1979 | Dulhunty | |
| 4,167,646 A | 9/1979 | Mathieu | |
| 4,259,541 A | 3/1981 | Bouche | |
| 4,362,900 A | 12/1982 | Nigol et al. | |
| 4,362,901 A | 12/1982 | Nigol et al. | |
| 4,384,166 A | 5/1983 | Nigol et al. | |

(Continued)

FOREIGN PATENT DOCUMENTS

BR    PI9905252-0    6/2001
(Continued)

OTHER PUBLICATIONS
International Search Report for PCT/BR2009/000042.

*Primary Examiner* — Angel R Estrada
(74) *Attorney, Agent, or Firm* — Scott Houtteman; Houtteman Law LLC

(57) ABSTRACT

The present invention refers to a device for dynamically neutralizing vibrations in single cable overhead power transmission lines. The device comprises a main body (2) a screw (5) and washer (6) assembly for mounting the main body onto the cable (3) and inertial components (11) consisting of rods (13) projecting in opposite directions from said main body (2) and balance masses (14) positioned at the distal end of said rods, wherein said main body (2) is integrally manufactured and comprises an upper frontal portion to receive an embracing lid (4) that embraces the cable (3) and side portions for mounting matching viscous-elastic components (7).

14 Claims, 4 Drawing Sheets

U.S. PATENT DOCUMENTS

| | | |
|---|---|---|
| 4,523,053 A | 6/1985 | Rawlins |
| 4,620,059 A | 10/1986 | Sherman |
| 4,620,060 A | 10/1986 | Perinetti |
| 6,774,303 B1 * | 8/2004 | Brittain et al. ............. 174/42 |
| 6,943,291 B2 * | 9/2005 | Brittain et al. ............. 174/42 |

FOREIGN PATENT DOCUMENTS

| | | |
|---|---|---|
| EP | 0345567 A1 | 12/1989 |
| GB | 2068081 | 8/1981 |
| WO | 02/07278 A1 | 1/2002 |

* cited by examiner

DEVICE FOR DYNAMICALLY NEUTRALIZING VIBRATIONS IN SINGLE CABLE OVERHEAD POWER TRANSMISSION LINES

This application is the U.S. national phase application of PCT No. PCT/BR2009/000042.

FIELD OF THE INVENTION

The present invention refers to a device for dynamically neutralizing vibrations to reduce the mechanical vibration caused by wind vortices, known as Von Kámán vortices in single cable overhead transmission lines, lightning conductor cables or cables known as OPGW, which combine the functions of earthen and communication though optic fibre. The device acts on the different cables inhibiting its rupture due to fatigue and thus reducing the maintenance time on power transmission lines.

The device according to the present invention incorporates a buffering system comprising material for dissipating the energy generated by movement of the cable which comprises an elastomer and a metallic inertial system consisting of two spherical masses mounted at the distal end of opposed rods. This inertial system may be symmetric or non-symmetric, that is, the masses and the associated rods may be the same, equal in dimension or may be distinct.

Apart from dissipating the energy generated by any movement of the cable, the device according to the present invention allows for and results in flexibility to the metallic inertial system, which comprises the masses mounted at the distal ends of the rods. Therefore, the present invention provides a dynamic system that responds to the movements of the cable to reduce its moment to safe levels of vibration.

The elastomeric elements of the device for neutralizing vibrations according to the present invention are made from a single elastomeric material. Additionally, one may observe the fact that the beneficial effects of the device over the cable are also produced by two inertial components integrally manufactured, such as its main body being responsible for the direct transmission of such effects. These very features and characteristics imply in a rather greater constructive simplicity, a greater structural robustness, a greater operational reliability, a lower unitary industrial manufacturing cost and all of this without reducing the performance in tests carried out in the field.

Thus one may confirm its utilitarian practicality for providing the electrical and telecommunications sector with additional freedom and choice options in the market with an enormous variety of possibilities and benefits.

BACKGROUND OF THE INVENTION

The overhead lines and cables widely used for the transmission of power and energy, of data and of lighting conducting cables are susceptible to ruptures due to fatigue caused by aeolian vibrations, that is, the vibration caused by the action of the wind acting upon cables.

When the wind travels on and along the overhead cables, an alternate unleashing of vortices of Von Kámán takes place which, consequently, produces alternate forces and pressures over the cables and cause mechanical vibrations.

These vibrations, which act permanently upon the cables may cause micro-fractures in the cables near the points where this movement is limited, such as, for example, in the proximity of the network of isolators suspended in the metallic towers, suspension staples, aerial signalling spheres, pre-fabricated connections, the actual places where the mechanical impedance is actually high.

With time these micro fractures grow in size and agglutinate until they reach a catastrophic growth velocity and cause a sudden rupture of the cable with all its economic and social consequences.

In view of the above, it is of utmost importance to reduce the vibrations on the cables by providing an efficient, low cost and durable device for neutralizing these vibrations which can be easily attached to the cables of overhead transmission lines.

The device for dynamically neutralizing vibrations according to the present invention complies with the all the above mentioned provisions and due to its generous viscous-elastic buffering, provided by the use of an elastomeric material particularly designed for this specific use, it easily distinguishes from the classic Stockbridge solution which presents a very low intrinsic buffering and, therefore, provides an excellent performance regarding the reduction of vibrations in a wide range of frequencies, covering all ranges of wind velocity.

The forces or excitations produced on the cables by the unleashing of Von Kámán's vortices are characterized by being random in time, depending on wind velocity and direction and its distribution along the cables. In scientific terms, it is said that these forces constitute a stochastic process of narrow range. While these forces have a rather narrow spectral content, that is, for each wind velocity its dependency of the wind velocity in frequency and amplitude makes the resonating vibrations along a wide range of frequencies, typically 5 to 150 Hz, they are able to be found on the cables in different moments in time.

Typically, two different approaches have been used to reduce the Aeolian vibrations in overhead cables and lines. The first one consists in the use of lines with large catenaries and is based on the fact that the intrinsic buffering is reduced by the increase of the mechanical traction acting on the cable due to its stretching because of its sheer weight. As such, stretching tractions are used to tension the cables, reaching a maximum of 20% of its rupture tension.

The second approach is the use of additional devices, known as dynamic vibration neutralizers, also known as buffers or even dynamic vibration absorbers, which are fixed to the vibrating cable with the purpose of reducing the vibrations caused by the vortices. These devices act by applying reactive forces and/or causing the dissipation of the vibratory energy.

A number of devices presently being used derive from the so-called Stockbridge buffer or neutralizer, which original design was patented by George H. Stockbridge in 1928 under U.S. Pat. No. 1,675,391, which consists of a symmetric or asymmetric neutralizers having a mechanical system with one, two or four degrees of freedom of movement. The device comprises a central mounting staple, two masses, equal or not, and two rods, generally metallic, equal or not, which assemble the above-mentioned elements. In this category of neutralizers one can list different types of devices which can be readily described in the following patents:

| Author/Inventor | Patent | Country |
| --- | --- | --- |
| George H. Stockbridge | 1,675,391 | US |
| Philip Wellesley Dulhunty | 3,711,624 | US |
| Philip Wellesley Dulhunty | 4,159,393 | US |

-continued

| Author/Inventor | Patent | Country |
| --- | --- | --- |
| Christopher Francis Beard | 2,068,081 A | UK |
| Alberto Perinetti | 4,620,060 | US |
| Giorgio Diana | 0,345,567 A1 | EPO |
| Philip Wellesley Dulhunty | WO 02/07278 A1 | PCT |

It is also possible for one to come across devices which, in a symmetrical form or non symmetrical, and of essential or accessorial form, encompass elastomeric materials in its composition. Such devices are known from following patents:

| Author/Inventor | Patent | Country |
| --- | --- | --- |
| Raymond R. Bouche | 4,011,397 | US |
| Charles Mathieu | 4,167,646 | US |
| Raymond R. Bouche | 4,259,541 | US |
| Charles B. Rawlins | 4,523,053 | US |
| José J. de Espíndola et al | PI 9905252-0 | BR |

Another category of the devices in use is the spiral vibration buffers, nothing more than spiral objects with the cable running through the middle of it, longitudinally. These devices are pre-fabricated and act as impact buffers or shock absorbers, striking the vibrating cable and are covered by the following patent:

| Author/Inventor | Patent | Country |
| --- | --- | --- |
| Thomas Sherman | 4,620,059 | US |

One can still find devices in which the vibrating energy dissipation takes place due to the friction of spring elements helicoidally shaped with the following patent:

| Author/Inventor | Patent | Country |
| --- | --- | --- |
| Paul D. Turtle | 4,140,868 | US |

And finally, there are devices produced for the reduction of the vibration in two or more cables, simultaneously, according to the following patents:

| Author/Inventor | Patent | Country |
| --- | --- | --- |
| Leopold Leblanc | 3,906,143 | US |
| Olaf Nigol, Herbert J.Houston | 4,362,900 | US |
| Olaf Nigol, Herbert J.Houston | 4,384,166 | US |

DEFICIENT FEATURES IN THE STATE OF THE ART

The devices derived from the Stockbridge buffer, widely found in overhead cables of power transmission lines are, as a whole, simple and of relatively low cost. Nevertheless, the buffering they provide is intrinsically very low. Typically, a Stockbridge type buffer has, in its rods, a loss factor of around 0.006 which is something resulting from its conception and from its metallic material constitution.

Because of this the devices derived from the Stockbridge buffer act much more due to applying reaction forces than due to dissipating vibrating energy, and thus its efficiency is restricted to ranges of very narrow frequencies, centralized in its resonant frequencies. In fact, they are so efficient in these frequencies that they can introduce highly elevated mechanical impedance on its fixing place and, around these places they can generate the problem of fatigue one is trying to avoid, particularly, on the supports near the towers. Additionally, this rather low buffering can lead to the very rupture due to the fatigue of the very dynamic device for neutralizing vibrations on the fixing place of the inertial mass with the steel rope. Thus, in some overhead lines one can find neutralizers without one of the inertial masses, thus attributing to this fact the low buffering of the presently used devices.

However, the majority of the devices manufactured with elastomeric materials, related to the previous item, do not present any action in the wide range frequency as it is required for the control of vibrations in overhead cables due to the fact it does not explore, in a precise and optimized manner, the particular dynamic features and characteristics of the used elastomers, those features and characteristics being dependant on the excitation frequency and the temperature.

The exception to this rule regarding the above comments is the device described by José J. de Espíndola et al in Brazilian patent application PI 9905252-0 filed in 1999. However, this device comprises elastomeric elements composed by two types of elastomeric material: one having a low buffering capacity to provide structural stability and the other having a high buffering capacity to allow for energy dissipation.

However, the fact that in the device according to the above Brazilian patent the elastomeric material having a high buffering capacity is surrounded by another elastomeric material renders the dissipation of heat to the atmosphere somewhat difficult. Comparatively, the present invention, apart from solving this problem, the dissipation of the energy of the vibration is carried out over a much larger surface, evidently resulting in a better dissipation of heat to the atmosphere.

Moreover, the metallic elements of the buffering device according to the above Brazilian patent consisted of various interconnecting pieces, which render the generation and the transmission of the effects of the neutralizing vibration to the cables somewhat difficult. Also, in addition to demanding more intensive labour and care during its assembling and fixing, exposing said metallic elements to high levels of vibration can lead to ruptures and consequently to undesirable accidents.

In view of the above, it is obvious that joining the new elastomeric elements according to the present invention with metallic elements of the previous devices is not a mere trivial constructive and production option but an important innovation.

Additionally, while the case studies related to the spiral buffers are, in numbers, extremely smaller than the case studies relative to the buffers according to Stockbridge, there are evidences that the spiral buffers are not efficient along wide range frequencies, a factor which is absolutely required for the control of Aeolian vibration in overhead cables and power lines.

DISTINCTION AND ADVANTAGEOUS FEATURES OF THE INVENTION

The device for dynamically neutralizing vibrations according to the present invention distinguishes from the others buffers as mentioned above due to the fact that its elasticity is concentrated in two viscous-elastic components positioned between an integrally-manufactured main body and the inertial components consisting of shells, rigid rods and spherical masses, which are also integrally manufactured.

Said viscous-elastic components comprise a single elastomer that allows for the components to be protected in such a way that the action of the device for neutralizing vibrations is distributed and spread over a wide and ample range of frequencies.

Therefore, in other words, in the device for dynamically neutralizing vibrations according to the present invention the viscous-elastic portion comprises viscous-elastic components, contrary to the Stockbridge, which elasticity derives from an interlaced cable. Because of the viscous-elastic components the device for dynamically neutralizing vibrations according to the present invention can present a loss factor, a buffering measurement of around 0.2 to 0.3, in comparison to the Stockbridge, which are around 0.006.

This means that the device for dynamically neutralizing vibrations according to the present invention, in addition to generating inertial forces to restrain the movement of the cable also applies buffering forces upon the cable. And it also means that according to the dynamics of the device for neutralizing vibrations system, the control of the vibration is carried out in an area substantially larger when compared to the purely metallic devices or when compared with those that use elastomeric materials without fully exploring its features and characteristics.

In practice, the device for dynamically neutralizing vibrations according to the present invention is designed to efficiently operate in all ranges and areas of frequencies of mechanical vibrations caused by Von Kámán's vortices on cables having different diameters. This covers all ranges of frequencies found in the field.

In conclusive terms, a proper installation of the device for dynamically neutralizing vibrations according to the present invention substantially increases the reliability of the overhead cables with regards to the reduction of its mechanical vibrations.

SUMMARY OF THE INVENTION

The device for dynamically neutralizing vibrations in single cable overhead power transmission lines according to the present invention neutralizer, which may exhibit one or two characteristic frequencies, was designed in such a manner chat when mounted on the transmission line the viscous-elastic components deform exclusively due to shearing, therefore carrying out a much more efficient energy dissipation.

For this it is essential that the mass centres of the inertial components be kept away by an exact distance, pre-determined in relation to the dynamic desired characteristics for the device for dynamically neutralizing vibrations in single cable overhead power transmission lines. It is worth mentioning the fact that according to this new design the viscous-elastic components can be manufactured separately from the various other principal components of the device.

According to the present invention, there is provided a device for dynamically neutralizing vibrations in a single cable overhead power transmission line comprising a main body, a screw and washer assembly for mounting the main body onto the cable and inertial components consisting of rods projecting in opposite directions from said main body and balance masses positioned at the distal end of said rods, wherein said main body is integrally manufactured and comprises an upper frontal portion to receive a embracing lid that embraces the cable and side portions for mounting matching viscous-elastic components, each comprising a rigid inner shell, an elastomeric plate made from a single material and a rigid outer shell, said rigid outer shells being part of an integrally-manufactured inertial component consisting of the rigid said shell, the rigid rod and the spherical mass.

In the device for dynamically neutralizing vibrations in single cable overhead power transmission lines as defined above, the centre of percussion of said inertial components is positioned in a straight line relative to the centre of said spherical masses and equidistant to the inner shells independently of the design of said main body.

In addition to the above, in the device for dynamically neutralizing vibrations in single cable overhead power transmission lines according to the present invention, the viscous-elastic components are joined to the main body by inner rigid shells and to the inertial components by outer rigid shells, the latter being directly joined to the shells of the set of inertial components.

Also, in the device for dynamically neutralizing vibrations in single cable overhead power transmission lines according to the present invention, the viscous-elastic components are formed where the shells are joined to the plate, preferably by an structural glue, injection or vulcanizing.

The device for dynamically neutralizing vibrations in single cable overhead power transmission lines according to the present invention has a highly elevated self-buffering action due to its constructive simplicity.

In power or energy and/or data transmission lines the use of the device for dynamically neutralizing vibrations in single cable overhead power transmission lines according to the present invention allows for an increased stretching mechanical traction applied to the cables, which makes it possible to reduce the number of towers and fittings and even to reduce the height of the towers as well as the length for the catenaries.

In existing lines, the device for dynamically neutralizing vibrations according to the present invention will optimize and increase the life time of the cables.

In both cases, the device for dynamically neutralizing vibrations according to the present invention will cause a substantial increase in the reliability of the transmission lines thanks to a more efficient control of the vibration.

BRIEF DESCRIPTION OF THE DRAWINGS

To complement the above description and in order to facilitate understanding the features of the present invention and the preferred examples its practical embodiments, a set of figures is included as an integral part of this specification, wherein the following has been represented in an illustrative and non-limiting manner.

DETAILED DESCRIPTION OF THE INVENTION

Figure 1:
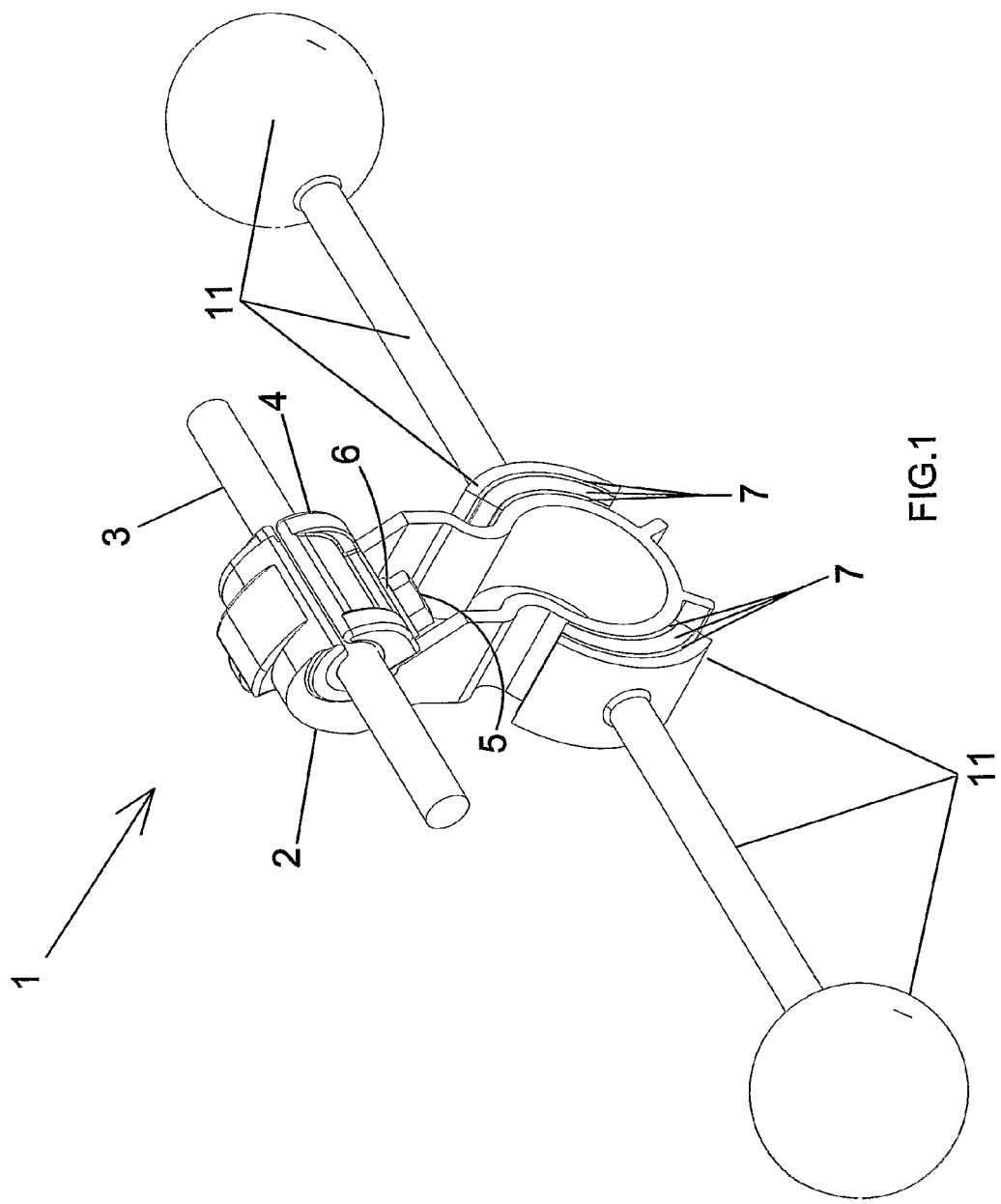
FIG. 1 is an upper frontal perspective view of the device for dynamically neutralizing vibrations in single cable overhead power transmission lines according to the present invention.
Figure 2:
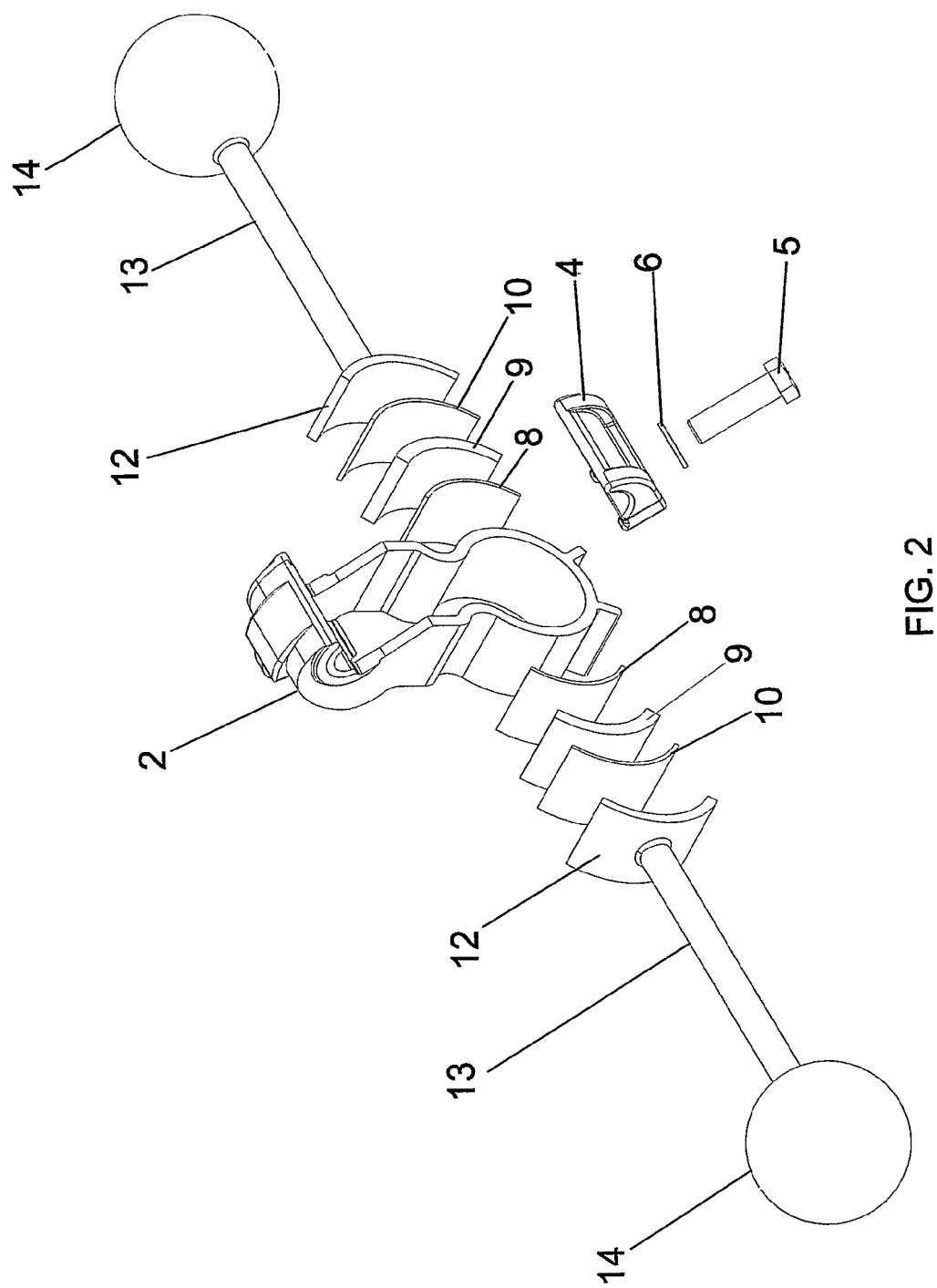
FIG. 2 is an upper frontal exploded perspective view of the device shown in FIG. 1.

With reference now more particularly to the drawings, FIG. 1 illustrates the device 1 for dynamically neutralizing vibrations in single cable overhead power transmission lines according to the present invention from an upper frontal perspective view. The device comprises a main body 2 to be mounted upon a cable 3 by means of a embracing lid 4, a screw 5 and a pressure washer 6.

Said main body 2 is integrally manufactured to define an upper frontal portion and side portions for mounting matching viscous-elastic components.

The upper frontal portion mounts upon the cable 3 with the help of a embracing lid 4. A fixing assembly consisting of screw 5 and pressure washer 6 fixes the embracing lid and consequently the cable to said main body 2.

Two viscous-elastic components 7 are joined to side portions of the main body 2 by a structural glue or another preferred manner, and two inertial components 11 project from said viscous-elastic components 7 to which they are joined also by structural glue or another preferred manner.

Each of said viscous-elastic components 7 comprises a rigid inner shell 8, an elastomeric plate 9 and a rigid outer shell 10, all of them similarly joined by structural glue or another preferred manner.

Each of said inertial components 11 comprise a shell 12, a rigid rod 13 and a spherical mass 14 mounted at the distal end of the rod 13.

The cooperating profiles of the side portions of the main body, of the viscous-elastic components and of the inertial components are designed to match each other.

Said inertial components can be nominally equal, to produce equal natural frequencies, or different, to produce different natural frequencies.

The viscous-elastic components 7 are connected to the main body 2 by fixing the inner shells 8 to its side portions and to the inertial components 11 through the outer shells 10 which are joined to the shells 12 of the inertial components 11.

The sizes or dimensional values of the spherical masses 14 and the length of the rigid rods 13 define, with the rigidity of the elastomeric plates 9, the characteristic frequencies of the device for dynamically neutralizing vibrations in single cable overhead power transmission lines according to the present invention, which can be varied in accordance to the interests of the vibration control in a screen, as long as the constructive principle of pure shearing in the viscous-elastic components is considered.

Figure 3:
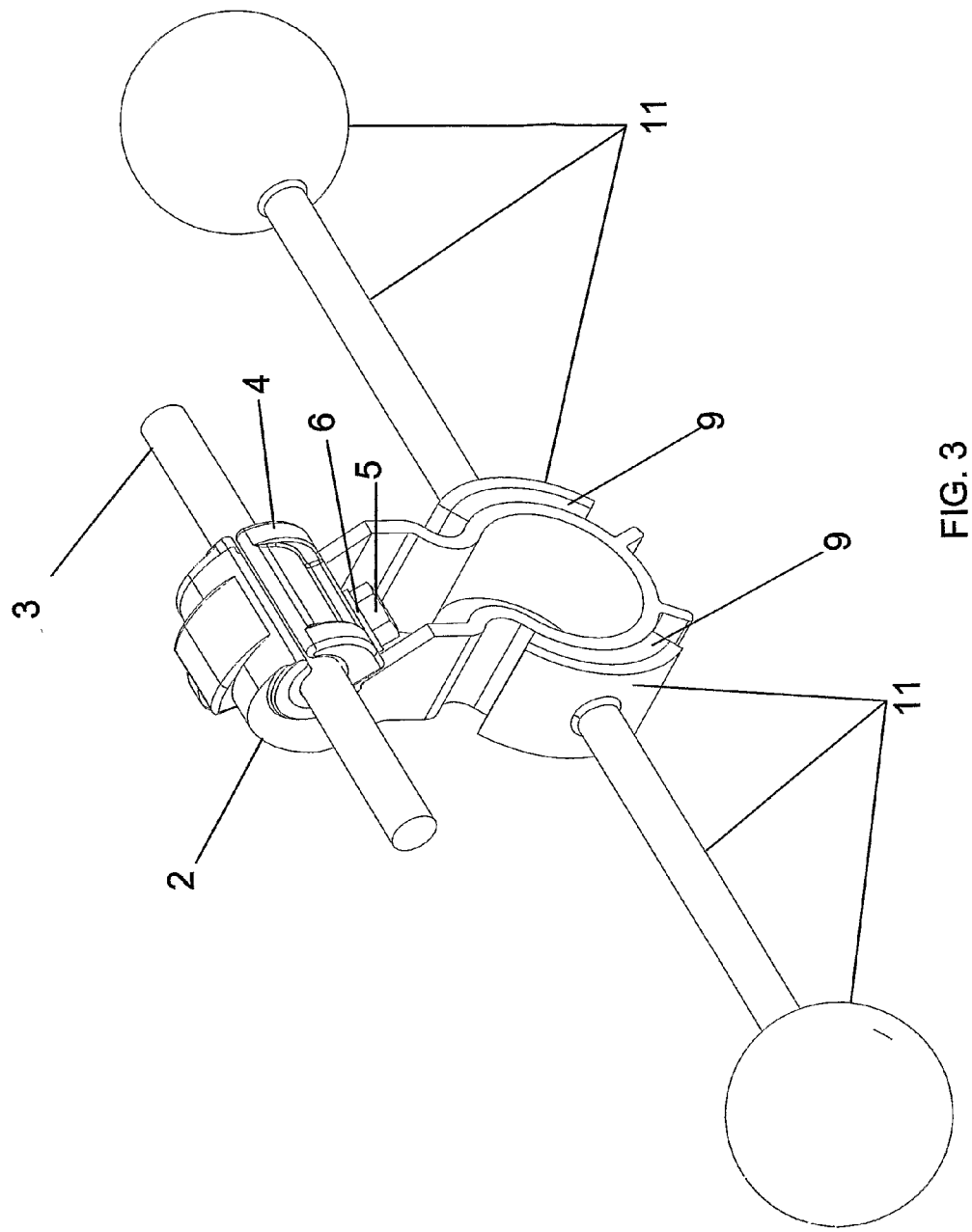
FIG. 3 is an upper frontal perspective view of a second embodiment of the device for dynamically neutralizing vibrations in single cable overhead power transmission lines according to the present invention.
Figure 4:
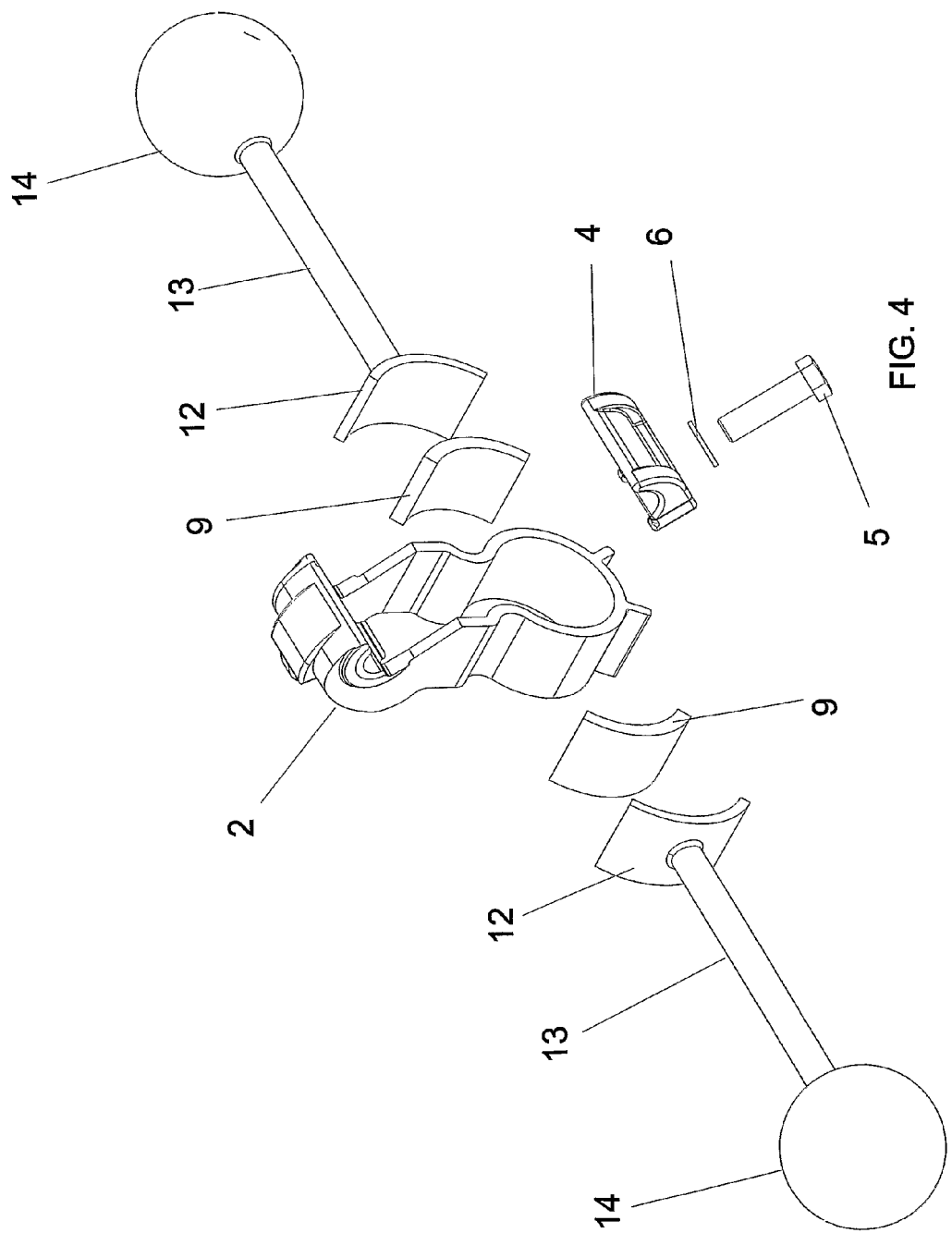
FIG. 4 is an upper frontal exploded perspective view of the device shown in FIG. 3.

FIG. 3 illustrates an upper frontal perspective view of a second embodiment of the device for dynamically neutralizing vibrations in single cable overhead transmission lines according to the present invention comprising an integrally manufactured main body 2 having an upper frontal portion for mounting upon the cable 3 by means of a embracing lid 4, a screw 5 and a pressure washer 6.

Two viscous-elastic components 7 are joined to side portions of the main body 2 by a structural glue or another preferred manner, and two inertial components 11 project from said viscous-elastic components 7 to which they are joined also by structural glue or another preferred manner.

Each of said viscous-elastic components 7 comprises an elastomeric plate 9 and is connected at the side portions of the main body 2 by the elastomeric plate 9 which also is joined to the shells 12 of the inertial components 11.

The invention claimed is:

1. A device for dynamically neutralizing vibrations in a single cable overhead power transmission line comprising a main body, a screw and washer assembly for mounting the main body onto the cable and inertial components consisting of rods projecting in opposite directions from said main body and balance masses positioned at the distal end of said rods, wherein said main body is integrally manufactured and comprises an upper frontal portion to receive a embracing lid that embraces the cable and side portions for mounting matching viscous-elastic components, each comprising a rigid inner shell, an elastomeric plate made from a single material and a rigid outer shell, said rigid outer shells being part of an integrally-manufactured inertial component consisting of the rigid said shell, the rigid rod and the spherical mass.

2. The device for dynamically neutralizing vibrations in single cable overhead power transmission lines as defined in claim 1, wherein the centre of percussion of said inertial components is positioned in a straight line relative to the centre of said spherical masses and equidistant to the inner shells independent of the design of said main body.

3. The device for dynamically neutralizing vibrations in single cable overhead power transmission lines as defined in claim 1 wherein the viscous-elastic components are joined to the main body by inner rigid shells and to the inertial components by outer rigid shells, the latter being directly joined to the shells of the set of inertial components.

4. The device for dynamically neutralizing vibrations in single cable overhead power transmission lines as defined in claim 1 wherein the viscous-elastic components are formed where the shells are joined to the plate, preferably by an structural glue, injection or vulcanizing.

5. The device for dynamically neutralizing vibrations in single cable overhead power transmission lines as defined in claim 1 wherein said plates are formed from a single elastomeric material.

6. The device for dynamically neutralizing vibrations in single cable overhead power transmission lines as defined in claim 1 wherein the rod for the set of inertial components is rigid.

7. The device for dynamically neutralizing vibrations in single cable overhead power transmission lines as defined in claim 1 wherein said inertial components are nominally equal, producing equal natural frequencies or nominally distinct, producing distinct natural frequencies.

8. A device for dynamically neutralizing vibrations in a single cable overhead power transmission line comprising a main body, a screw and washer assembly for mounting the main body onto the cable and inertial components consisting of rods projecting in opposite directions from said main body and balance masses positioned at the distal end of said rods, wherein said main body is integrally manufactured and comprises an upper frontal portion to receive a embracing lid that embraces the cable and side portions for mounting matching viscous-elastic components, each comprising an elastomeric plate made from a single material part of an integrally-manufactured inertial component consisting of the elastomeric plate, the rigid rod and the spherical mass.

9. The device for dynamically neutralizing vibrations in single cable overhead power transmission lines as defined in claim 8 wherein the centre of percussion of said inertial components is positioned in a straight line relative CO the centre of said spherical masses and equidistant to the inner shells independent of the design of said main body.

10. The device for dynamically neutralizing vibrations in single cable overhead power transmission lines as defined in claim 8 wherein the plates are directly joined to the main body and to the shells of the set of inertial components.

11. The device for dynamically neutralizing vibrations in single cable overhead power transmission lines as defined in claim 8 wherein the plates are joined to the main body and to the inertial components, preferably by means of an structural glue, injection and vulcanizing.

12. The device for dynamically neutralizing vibrations in single cable overhead power transmission lines as defined in claim 8 wherein said plates are formed from a single elastomeric material.

13. The device for dynamically neutralizing vibrations in single cable overhead power transmission lines as defined in claim 8 wherein the rod for the set of inertial components is rigid.

14. The device for dynamically neutralizing vibrations in single cable overhead power transmission lines as defined in claim 8 wherein said inertial components are nominally equal, producing equal natural frequencies or nominally distinct, producing distinct natural frequencies.

* * * * *